(12) United States Patent
Huang

(10) Patent No.: US 9,829,903 B1
(45) Date of Patent: Nov. 28, 2017

(54) POWER POINT TRACKING METHOD AND APPARATUS THEREOF

(71) Applicant: INDUSTRIAL TECHNOLOGY RESEARCH INSTITUTE, Hsinchu (TW)

(72) Inventor: Chao-Jen Huang, Taichung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 15/351,048

(22) Filed: Nov. 14, 2016

(30) Foreign Application Priority Data

Aug. 15, 2016 (TW) .............................. 105125956 A

(51) Int. Cl.
*H02M 3/156* (2006.01)
*G05F 1/67* (2006.01)
(Continued)

(52) U.S. Cl.
CPC ................ *G05F 1/67* (2013.01); *H02M 1/08* (2013.01); *H02M 3/155* (2013.01); *H02M 2001/0048* (2013.01)

(58) Field of Classification Search
CPC ...................... H02M 2001/0083; H02M 3/156
(Continued)

(56) References Cited

U.S. PATENT DOCUMENTS 5,801,519 A * 9/1998 Midya ...................... G05F 1/67
323/222

8,664,931 B2 * 3/2014 Schneider ................. G05F 1/67
323/224
(Continued)

FOREIGN PATENT DOCUMENTS

CN 1627225 A 6/2005
CN 101253461 A 8/2008
(Continued)

OTHER PUBLICATIONS

Enrico Bianconi et al., "A fast current-based MPPT technique based on sliding mode control" *2011 IEEE International Symposium on Industrial Electronics* (*ISLE*), Jun. 27-30, 2011, pp. 59-64.
(Continued)

*Primary Examiner* — Jeffrey Sterrett
(74) *Attorney, Agent, or Firm* — Muncy, Geissler, Olds & Lowe, P.C.

(57) ABSTRACT

A power point tracking method and a power point tracking apparatus are provided. A power point tracking method, comprising obtaining, by a controller, a first operating point and a first characteristic curve according to an open-circuit voltage or an input voltage of an energy harvester; calculating, by the controller, a first duty cycle signal according to the first operating point, a converter characteristic, an output voltage and a desired operating point; operating, by a converter, after receiving the first duty cycle signal; obtaining, by the controller, a second characteristic curve by calculating a second operating point according to the input voltage, the output voltage and the first duty cycle signal; and calculating, by the controller, a second duty cycle signal for transferring to the converter for a tracking control according to the second characteristic curve, the converter characteristic, the output voltage and the desired operating point.

25 Claims, 7 Drawing Sheets

(51) Int. Cl.
*H02M 3/155* (2006.01)
*H02M 1/08* (2006.01)
*H02M 1/00* (2006.01)

(58) Field of Classification Search
USPC .................. 323/222, 282, 285, 299, 351
See application file for complete search history.

(56) References Cited

U.S. PATENT DOCUMENTS

| | | | |
|---|---|---|---|
| 9,257,896 B1* | 2/2016 | Shih | H02M 1/14 |
| 2003/0066555 A1 | 4/2003 | Hui et al. | |
| 2008/0111517 A1 | 5/2008 | Pfeifer et al. | |
| 2009/0284078 A1 | 11/2009 | Zhang et al. | |
| 2009/0284240 A1 | 11/2009 | Zhang et al. | |
| 2010/0198424 A1 | 8/2010 | Takehara et al. | |
| 2011/0175454 A1 | 7/2011 | Williams et al. | |
| 2011/0276188 A1 | 11/2011 | Beck | |
| 2012/0016529 A1 | 1/2012 | Jiang et al. | |
| 2012/0176102 A1 | 7/2012 | Kim et al. | |
| 2012/0306278 A1* | 12/2012 | Fajtl | H02M 3/156 307/82 |
| 2013/0241465 A1* | 9/2013 | Teggatz | H02J 7/0073 320/101 |
| 2014/0103723 A1 | 4/2014 | Jergovic et al. | |
| 2014/0111015 A1* | 4/2014 | Fall | H01L 31/02021 307/66 |
| 2014/0285133 A1* | 9/2014 | Toledo | H02J 7/007 320/101 |
| 2015/0002127 A1* | 1/2015 | Huang | G05F 1/67 323/311 |
| 2015/0207411 A1* | 7/2015 | Calhoun | H02M 1/088 323/235 |
| 2015/0381033 A1* | 12/2015 | Huang | H02M 3/04 323/234 |
| 2016/0197508 A1* | 7/2016 | Kruiskamp | H02J 7/0068 307/130 |
| 2016/0359409 A1* | 12/2016 | Theoduloz | H02M 1/08 |

FOREIGN PATENT DOCUMENTS

| | | |
|---|---|---|
| CN | 102782979 | 11/2012 |
| TW | 293964 B | 12/1996 |
| TW | 201315116 A | 4/2013 |
| TW | 201500883 A | 1/2015 |
| TW | I522766 | 2/2016 |

OTHER PUBLICATIONS

S. Patel et al., "Fast converging digital MPPT Control for Photovoltaic (PV) Applications" *2011 IEEE Power and Energy Society General Meeting*, Jul. 24-29, 2011, pp. 1-6.
Lijun Gao et al., "Portable Solar Systems using a Step-up Power Converter with a Fast-Speed MPPT and a Parallel-configured Solar Panel to Address Rapidly Changing Illumination" *Twenty Second Annual IEEE Applied Power Electronics Conference, APEC 2007*, Feb. 25, 2007 through Mar. 1, 2007, pp. 520-523.
Enrico Bianconi et al., "A fast current-based MPPT technique Employing sliding mode control" *2011 IEEE Transactions on Industrial Electronics*, vol. 60, No. 3, Mar. 2013, pp. 1168-1178.
Hoonki Kim et al., "An Energy-Efficient Fast Maximum Power Point Tracking Circuit in an 800-μ W Photovoltaic Energy Harvester" *IEEE Transactions on Power Electronics*, vol. 28, No. 6, Jun. 2013, pp. 2927-2935.
Panagiotis E. Kakosimos et al., "Fast Photovoltaic-System Voltage- or Current-Oriented MPPT Employing a Predictive Digital Current-Controlled Converter" *IEEE Transactions on Industrial Electronics*, vol. 60, No. 12, Dec. 2013, pp. 5673-5685.
Radhakrishna Kotti et al., "Fast Converging MPPT Control of Photovoltaic systems under Partial Shading conditions" *2012 IEEE International Conference on Power Electronics, Drives and Energy Systems*, Dec. 16-19, 2012, Bengaluru, India, 6 pages.
M. Balato et al., "A Hybrid MPPT technique based on the Fast Estimate of the Maximum Power Voltages in PV applications" *2013 Eighth International Conference and Exhibition on Ecological Vehicles and Renewable Energies (EVER)*, 2013, 7 pages.
Gali Vijayakumar et al., "Development of Low Cost High Efficient DC-DC Converter for Photovoltaic System with Fast Converging MPPT Algorithm" *2013 International Conference on Renewable Energy and Sustainable Energy (ICRESE)*, 2013, pp. 98-104.
Marco Balato et al., "Simulation and Laboratory Characterization of a Hybrid MPPT technique based on the Fast Estimate of the Maximum Power Voltages in PV applications" *2013 IEEE International Instrumentation and Measurement Technology Conference (I2MTC)*, 2013, pp. 218-223.
Tey Kok Soon et al., "A Fast-Converging MPPT Technique for Photovoltaic Systems Under Fast-Varying Solar Irradiation and Load Resistance" *IEEE Transactions on Industrial Informatics*, vol. 11, No. 1, Feb. 2015, pp. 176-186.
Yousef Mahmoud et al., "Fast Power-Peaks Estimator for Parially Shaded PV Systems" *IEEE Transactions on Energy Conversion*, 2016 vol. 31, Issue 1, pp. 206-217.
Ashish Pandey et al., "High-Performance Algorithms for Drift Avoidance and Fast Tracking in Solar MPPT System" *IEEE Transactions on Energy Conversion*, vol. 23, No. 2, Jun. 2008, pp. 681-689.
Somnath Maity et al., "Modeling and Analysis of a Fast and Robust Module-Integrated Analog Photovoltaic MPP Tracker" *IEEE Transactions on Power Electronics*, 2016, vol. 31, Issue 1 pp. 280-291.
Yunping Wang et al., "High Accuracy and Fast Speed MPPT Methods for PV String Under Partially Shaded Conditions" *IEEE Transactions on industrial Electronics*, 2016, vol. 63, Issue 1, pp. 235-245.
M. Zigliotto et al., "A fast-MPPT low-complexity autonomous PV water pumping scheme for PMSM" *3rd Renewable Power Generation Conference (RPG 2014)*, 2014, pp. 1-6.
Francisco Paz et al., "Fast and Efficient Solar Incremental Conductance MPPT Using Lock-In Amplifier" *2015 IEEE 6th International Symposium on Power Electronics for Distributed Generation Systems (PEDG)*, 2015, pp. 1-6.

\* cited by examiner

US 9,829,903 B1

POWER POINT TRACKING METHOD AND APPARATUS THEREOF

CROSS REFERENCE TO RELATED APPLICATION

This application claims the priority benefit of Taiwan application serial no. 105125956, filed on Aug. 15, 2016. The entirety of the above-mentioned patent application is hereby incorporated by reference herein.

TECHNICAL FIELD

The technical field generally relates to a power point tracking (PPT) method and a PPT apparatus.

BACKGROUND

In general, renewable energy power gains very small share of global electricity market. However, due to the limited fossil fuels resource and their negative impacts on the environment, the industry is being urged to improve and upgrade renewable energy technology. Other than using renewable energy to replace fossil fuels, environmental energy can be further collected for the reuse. Among these research areas, a thermoelectric material (TEM) and an energy harvesting (EH) are two hot research topics.

Many energy sources have the maximum power point (MPP) characteristic, for example, FIG. 1 shows a characteristic curve of the output current versus (vs.) the output voltage of a thermoelectric (TE) energy source (for example, TE Generator. TEG) and a characteristic curve of the output power vs. the output voltage of a TE energy source (for example, TEG). In the upper part (a) of FIG. 1, the abscissa represents output voltage $V_{TE}$ of the TE energy source and the ordinate represents output current $I_{TE}$ of the TE energy source; in the lower part (b) of FIG. 1, the abscissa represents output voltage $V_{TE}$ of the TE energy source and the ordinate represents output power $P_{TE}$ of the TE energy source. It can be seen from FIG. 1 that the larger the output current $I_{TE}$ of the TE energy source is, the smaller the output voltage $V_{TE}$ thereof is. When the output voltage $V_{TE}$ of the TE energy source is set at an operation voltage $V_{OP}$ shown by FIG. 1, the output power $P_{TE}$ achieves the maximum power value $P_{MAX}$ (that is, the MPP).

Another example is given by FIG. 2, wherein a characteristic curve of the output current vs. the output voltage of a photovoltaic cell (PV cell) and a characteristic curve of the output power vs. the output voltage of a PV cell are illustrated. In the upper part (a) of FIG. 2, the abscissa represents output voltage $V_{PV}$ of the PV cell and the ordinate represents output current $I_{PV}$ of the PV cell; in the lower part (b) of FIG. 2, the abscissa represents output voltage $V_{PV}$ of the PV cell and the ordinate represents output power $P_{PV}$ of the PV cell. It can be seen from FIG. 2 that the larger the output current $I_{PV}$ of the PV cell is, the smaller the output voltage $V_{PV}$ thereof is. When the output voltage $V_{PV}$ of the PV cell is set at an operation voltage $V_{OP}$ shown by FIG. 2, the output power $P_{PV}$ achieves the maximum power value $P_{MAX}$ (that is, the MPP).

During employing and operating an energy source with the MPP characteristic, it is needed to track the power point on the output of the energy source to advance the power-generating efficiency.

SUMMARY OF THE DISCLOSURE

According to an embodiment of the disclosure, a power point tracking method comprises: obtaining, by a controller, a first operating point and a first characteristic curve according to an open-circuit voltage or an input voltage of an energy harvester; calculating, by the controller, a first duty cycle signal according to the first operating point, a converter characteristic, an output voltage and a desired operating point; operating, by a converter, after receiving the first duty cycle signal; obtaining, by the controller, a second characteristic curve by calculating a second operating point according to the input voltage, the output voltage and the first duty cycle signal; and calculating, by the controller, a second duty cycle signal for transferring to the converter for a tracking control according to the second characteristic curve, the converter characteristic, the output voltage and the desired operating point.

According to an embodiment of the disclosure, a power point tracking apparatus comprises a converter coupled to a controller, wherein the converter utilizes an inductor inside the converter to perform a power conversion operation according to a duty cycle signal of the controller so as to convert an input voltage supplied by an energy harvester into an output voltage for a load; and the controller, wherein the controller calculates a the duty cycle signal for transferring to the converter for a tracking control according to a characteristic curve, a converter characteristic and the output voltage.

The foregoing will become better understood from a careful reading of a detailed description provided herein below with appropriate reference to the accompanying drawings.

DETAILED DESCRIPTION OF DISCLOSED EMBODIMENTS

Figure 1:
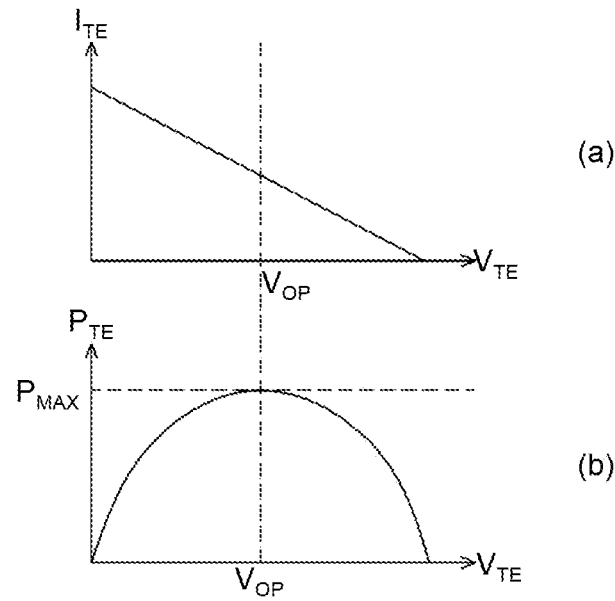
FIG. 1 is a schematic diagram illustrating a characteristic curve of the output current vs. the output voltage and a characteristic curve of the output power vs. the output voltage of a TE energy source (TE generator or TE harvester).
Figure 2:
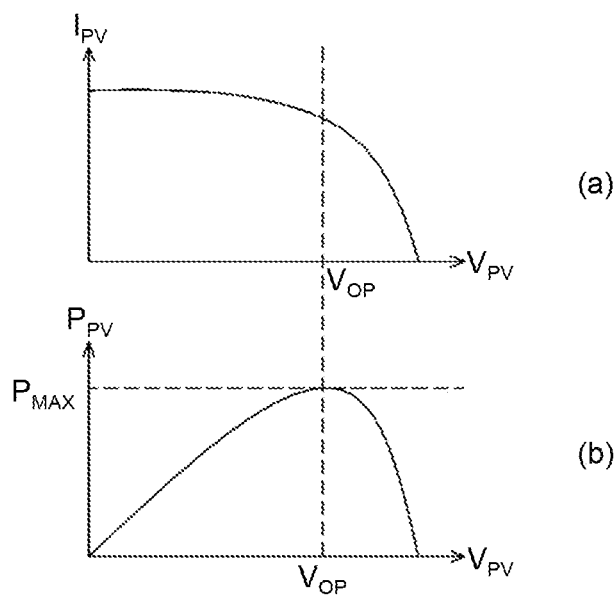
FIG. 2 is a schematic diagram illustrating a characteristic curve of the output current vs. the output voltage and a characteristic curve of the output power vs. the output voltage of a PV cell.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 3:
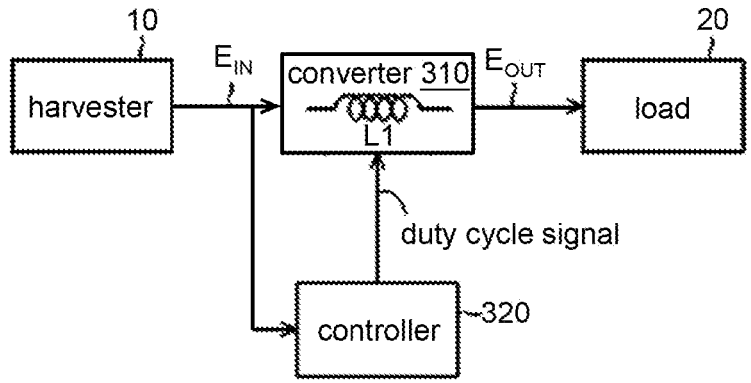
FIG. 3 is a block diagram of an exemplary circuit of a PPT apparatus.

FIG. 3 is a block diagram of an exemplary circuit of a PPT apparatus. The PPT apparatus comprises a converter 310 and a controller 320, wherein the controller 320 may be, but not limited to a digital controller and may include one or more analog-digital converters. The converter 310 may be, but not limited to a synchronous direct current to direct current (DC-DC) converter or an asynchronous DC-DC converter or other power converters. For example, the converter 310 may be a boost converter, a buck converter, a buck-boost converter, a flyback converter, a single-ended primary-inductor (SEPIC) converter, a step-down/step-up converter based on a switching boost-buck topology (Cúk converter) or other converters using an inductor L to perform a power conversion operation. The converter 310 may utilize the inductor L inside the converter 310 to perform a power conversion operation according to a duty cycle signal of the controller 320 so as to convert an input voltage supplied by an energy harvester 10 into an output voltage for a load 20. For example, the converter 310 may utilize the output voltage to charge the load 20, wherein the load may be, but not limited to a battery.

The energy harvester 10 has the feature of a maximum power point (MPP). For example, the energy harvester 10, but not limited to be a fuel cell, a thermoelectric harvester, a photovoltaic harvester, a piezoelectric harvester or a DC device with limited energy. The controller 320 monitors the output current of the energy harvester 10 by the input current of the converter 310. Thus, the controller 320 may track the MPP∓ of the energy harvester 10 according to the output current of the energy harvester 10. In other words, the controller 320 controls a charging operation of the load 20 according to the output current of the energy harvester 10.

Figure 4:
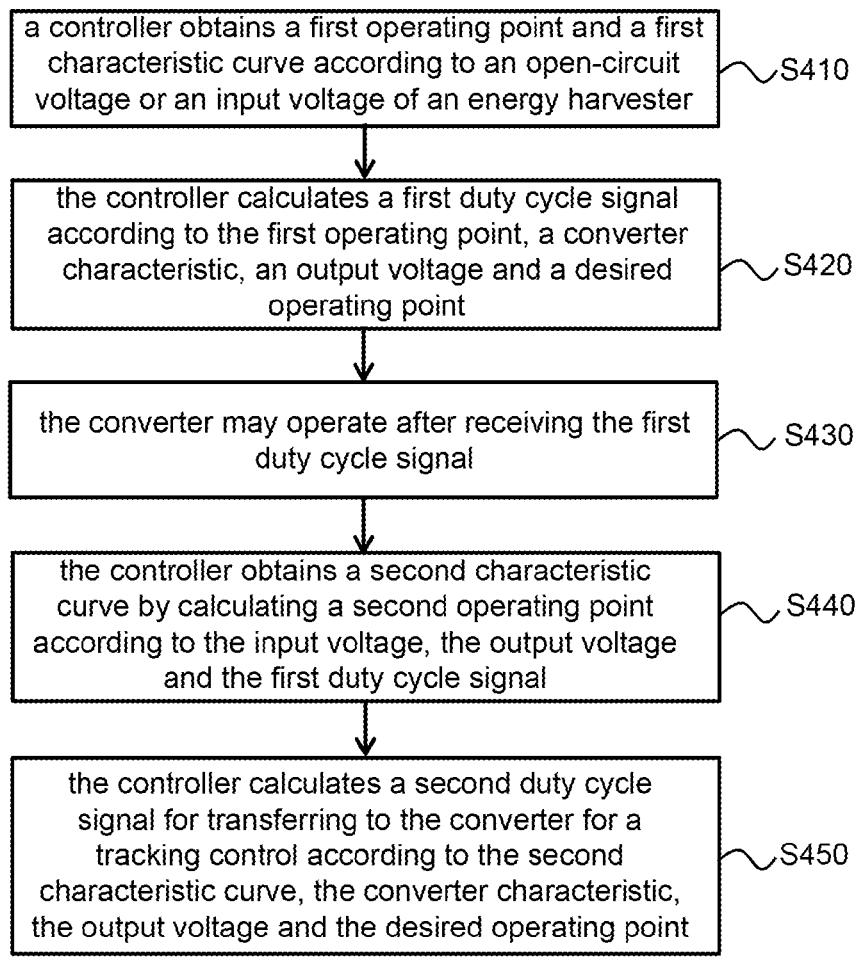
FIG. 4 is a schematic flow chart of a PPT method according to an embodiment of the disclosure.

FIG. 4 is a schematic flow chart of a PPT method according to an embodiment of the disclosure. Referring to FIG. 3 and FIG. 4, in step S410, a controller obtains a first operating point and a first characteristic curve according to an open-circuit voltage or an input voltage of an energy harvester 10. In step S420, the controller calculates a first duty cycle signal according to the first operating point, a converter characteristic, an output voltage and a desired operating point. In step S430, the converter may operate after receiving the first duty cycle signal. In step S440, the controller obtains a second characteristic curve by calculating a second operating point according to the input voltage, the output voltage and the first duty cycle signal. In step S450, the controller calculates a second duty cycle signal for transferring to the converter for a tracking control according to the second characteristic curve, the converter characteristic, the output voltage and the desired operating point. An input voltage $E_{IN}$ supplied by the energy harvester 10 is converted into an output voltage $E_{OUT}$ for the load 20. The load 20 can be a resistive load, a capacitive load or an inductive load. For example, the converter 310 utilizes the output voltage $E_{OUT}$ to charge the load 20.

Under the condition without loading, the controller 320 will set the operating point to satisfy an output requirement for a load size, so as to balance the total energy balance. Therefore, when the operating is in a steady condition, the operating point times the converter efficiency will be equal to the load size. Under the condition with loading, the controller 320 will assess a maximum acceptable energy and the load size for calculating the operation point. When the sum of the maximum acceptable energy of the battery and the load size is greater than the maximum energy of the energy harvester 10 in the controller, the controller 320 will perform an energy converting control by a set optimum operating point. When the sum is smaller than the maximum energy of the energy harvester 10, the operating point times the converter efficiency will be equal to the sum of the maximum acceptable energy and the load size in a steady operating.

Figure 5:
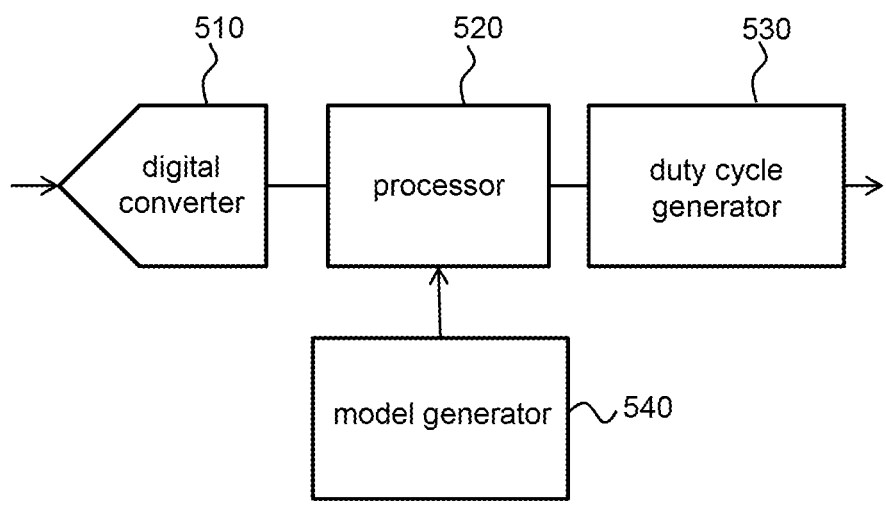
FIG. 5 is a circuit of an exemplary circuit of a controller.
Figure 6:
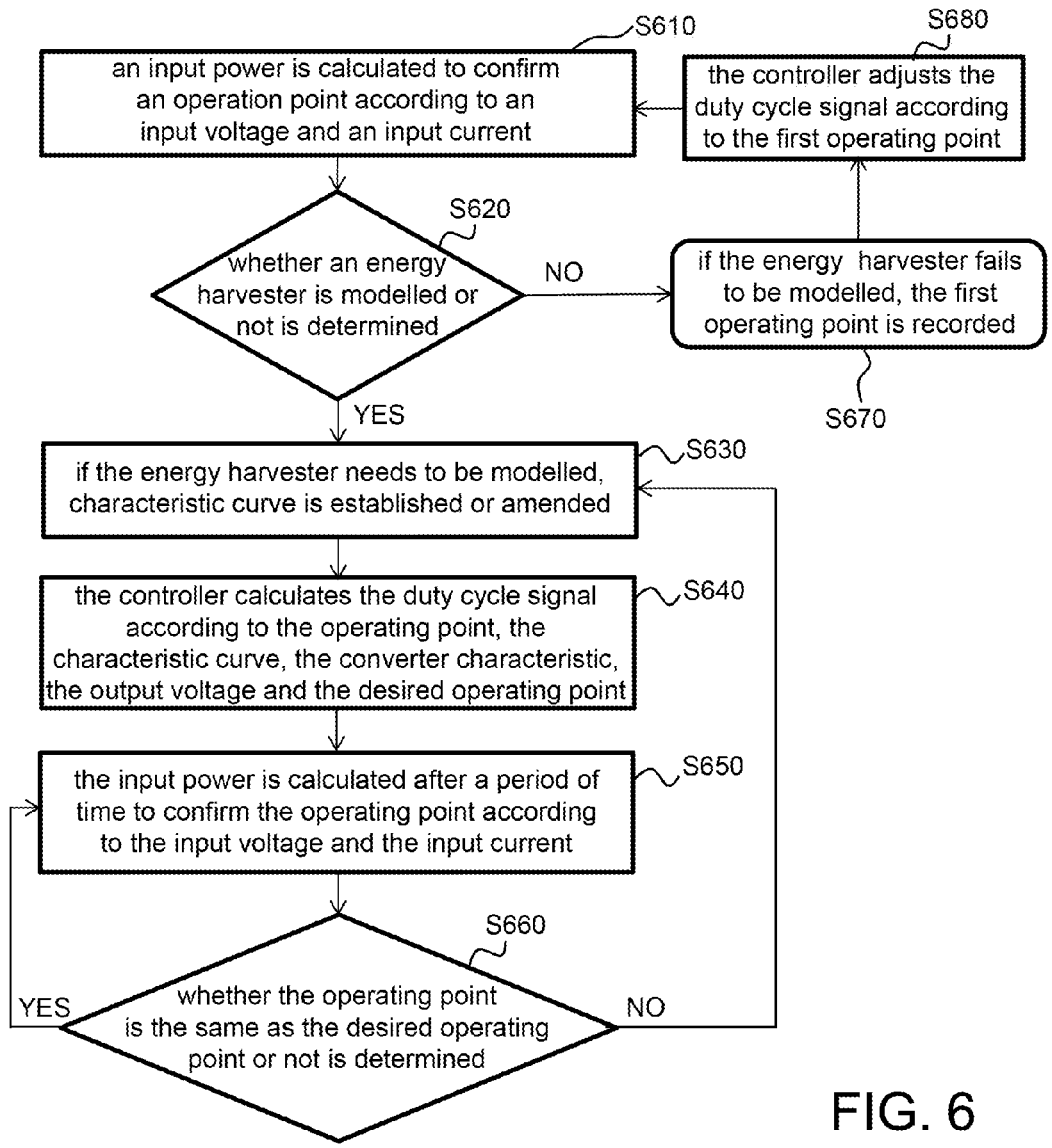
FIG. 6 is a schematic flow chart of a PPT method according to another embodiment of the disclosure.

FIG. 5 shows an exemplary circuit of the controller 320. The controller 320 comprises an analog-to-digital converter 510, a processor 520, a duty cycle generator 530 and a model generator 540. The model generator 540 provides a characteristic curve for the processor 520, wherein the controller 320 may use a pulse width modulation (PWM), a pulse skip modulation (PSM), a sigma-delta modulation (SDM) or a burst modulation. The controller 320 and the converter 310 may operate in a discontinuous current mode (DCM) or a continuous current mode (CCM), wherein the processor 520 may be an application-specific integrated circuit (ASIC), or a microcontroller unit (MCU). The mode generator 540 may be, but not limited to an energy harvester, or a limited energy, or a rectified alternating current (AC) typed energy harvester or limited energy.

The duty cycle generator 530 may be a digital pulse width modulation (PDM) generator for generating the duty cycle signal, or may use a digital-to-analog converter (DAC) and a sawtooth generator to generate the duty cycle signal.

6 is a schematic flow chart of a PPT method according to another embodiment of the disclosure. In step S610, an input power is calculated to confirm an operation point according to an input voltage and an input current. In step S620, whether an energy harvester is modelled or not is determined. In step S630, if the energy harvester needs to be modelled, a characteristic curve of an energy harvester is established or amended. In step S640, the controller calculates the duty cycle signal according to the operating point, the characteristic curve, the converter characteristic, the output voltage and the desired operating point. In step S650, the input power is calculated after a period of time to confirm the operating point according to the input voltage and the input current. In step S660, whether the operating point is the same as the desired operating point or not is determined. If it is the same, step S650 is performed; otherwise, step S630 is performed. In step S670, if the energy harvester fails to be modelled, the first operating point is recorded. In step S680, the controller adjusts the duty cycle signal according to the first operating point, and then step S610 is performed.

Figure 7:
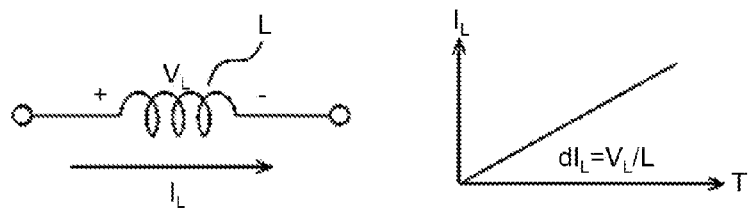
FIG. 7 is a schematic diagram illustrating a current characteristic curve of an inductor.

FIG. 7 is a schematic diagram illustrating a current characteristic curve of the inductor L inside the converter 310 of FIG. 3. In the right part of FIG. 7, the abscissa represents time T and the ordinate represents current $I_L$ of the inductor L. The controller 320 may calculate the current $I_L$ of the inductor L according to the voltage $V_L$ across the two ends of the inductor L, the inductance L of the inductor L and the time T, according to formula (1):

$$dI_L = (1/L)\int V_L dt \qquad \text{formula (1)}$$

Figure 8:
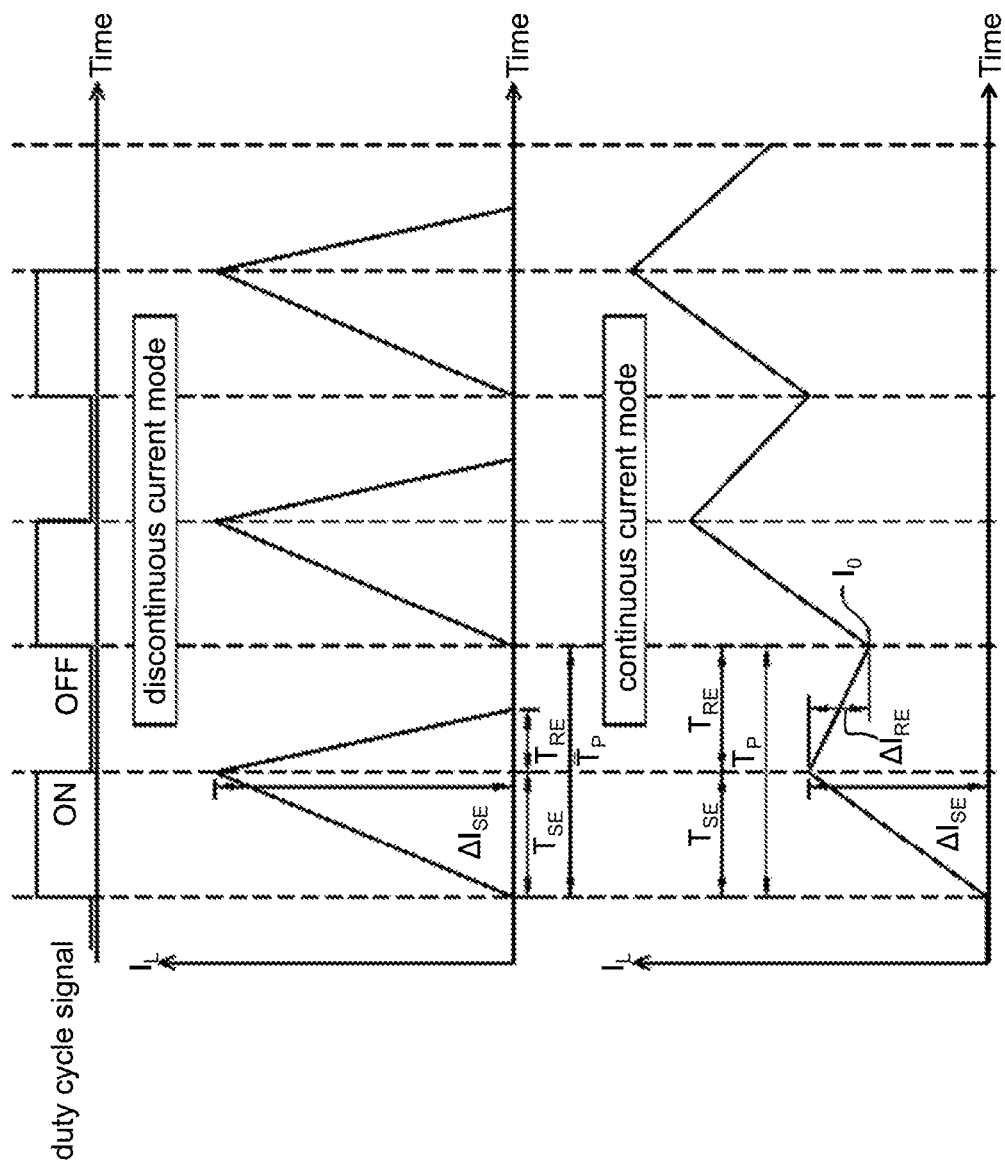
FIG. 8 is a diagram showing the calculating for the inductor inside the converter in FIG. 3 respectively operating in a discontinuous current mode (DCM) and a continuous current mode (CCM).

FIG. 8 is a diagram showing the calculating for the inductor inside the converter 310 in FIG. 3 respectively operating in a discontinuous current mode (DCM) and a continuous current mode (CCM). The upper part of FIG. 8 shows the waveform timing of the duty cycle signal, in which the abscissa represents time and the ordinate represents the amplitude of the duty cycle signal. The middle part of FIG. 8 shows the current waveform of the inductor L operated in the DCM, in which the abscissa represents time and the ordinate represents the current $I_L$ of the inductor L. In the DCM, first, the controller 320 calculates a current variation $\Delta I_{SE}$ of the inductor L in an energy-storing duration $T_{SE}$ according to the voltage $V_L$ across the two ends of the inductor L and the energy-storing duration $T_{SE}$ of the inductor L; then, the controller 320 calculates an energy-releasing duration $T_{RE}$; finally, the controller 320 calculates an average current $I_{AVG}$, an output current $I_O$ and a power of the inductor L according to $\Delta I_{SE}$, $T_{SE}$, $T_{RE}$ and the period $T_P$ of the duty cycle signal. The information of the average current $I_{AVG}$, the output current $I_O$ and/or the power of the inductor L serves as the characteristic value, by which the controller 320 may perform PPT for an input electrical energy $E_{IN}$.

The lower part of FIG. 8 shows the current waveform timing of the inductor L operating in the CCM, in which the abscissa represents time and the ordinate represents the current $I_L$ of the inductor L. In the CCM, first, the controller 320 calculates the current variation $\Delta I_{SE}$ of the inductor L in the energy-storing duration $T_{SE}$, according to the voltage $V_L$ across the two ends of the inductor L and the energy-storing duration $T_{SE}$ of the inductor L; then, the controller 320 calculates the current variation $\Delta I_{RE}$ of the inductor L in the energy-releasing duration $T_{RE}$ according to the energy-releasing duration $T_{RE}$, so as to obtain an initial current $I_0$ of the inductor L in a next period $T_P$; Finally, in the next period $T_P$, the controller 320 calculates the average current $I_{AVG}$ or the power of the inductor L from $\Delta I_{SE}$, $\Delta I_{RE}$ and $I_0$. The information of the average current $I_{AVG}$ or the power of the inductor L herein serves as the duty cycle signal, by which the controller 320 may perform PPT for the input electrical energy $E_{IN}$.

Figure 9:
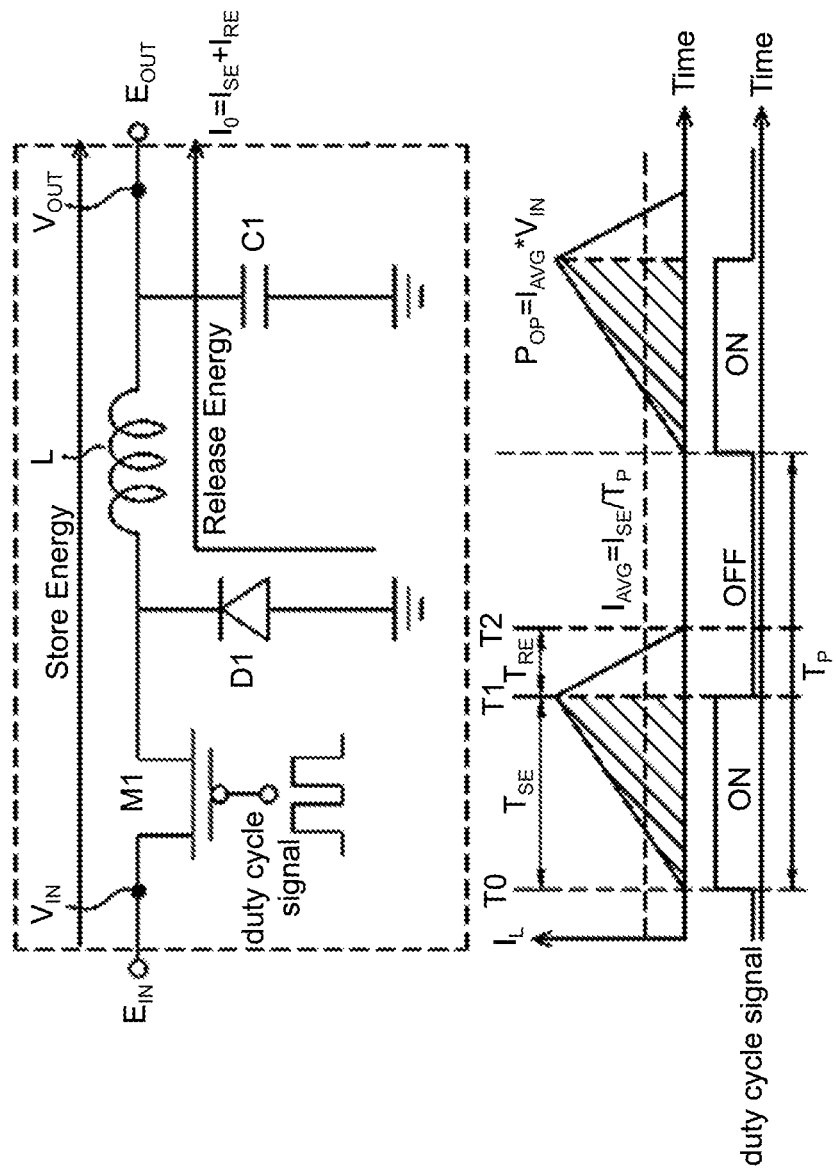
FIG. 9 is a circuit diagram of a buck converter according to an embodiment of the disclosure and illustrates a waveform timing for the buck converter operating in the DCM.

Referring to FIGS. 3 and 9, a power switch M1 is controlled by the duty cycle signal. According to the duty cycle signal, the power switch M1 divides a power conversion operation into an inductance energy-storing operation and an inductance energy-releasing operation. In the energy-storing duration, the power switch M1 is turned on, therefore, the current of the input electrical energy $E_{IN}$ at the time may pass through the power switch M1 and the input electrical energy $E_{IN}$ may be stored in the inductor L and a capacitor C1. In the energy-releasing duration, the power switch M1 is turned off and the inductor L at the time provides a current flowing from a diode D1 into the capacitor C1 and the load 20.

The lower part of FIG. 9 illustrates a waveform timing of the duty cycle signal, in which the abscissa represents the time and the ordinate represents the amplitude of the duty cycle signal. The middle part of FIG. 9 shows the current waveform of the inductor L operating in DCM, in which the abscissa represents the time and the ordinate represents the current $I_L$ of the inductor L. When the inductor L operates in the energy-storing duration, the controller 420 calculates the voltage difference $V_L$ of the inductor L by formula (2), in which $V_{IN}$ represents the voltage of the input electrical energy $E_{IN}$, $V_{M1}$ represents the conductive voltage drop of the power switch M1, and $V_{OUT}$ represents the voltage of the output electrical energy $E_{OUT}$.

$$V_L = V_{IN} - V_{M1} - V_{OUT} \quad \text{formula (2)}$$

After obtaining the voltage difference $V_L$ of the inductor L, the controller 320 may calculate formula (1) to obtain the current $I_L$ of the inductor L, as illustrated in the derision of formula (3). In formula (3), L is the inductance of the inductor L, and T1 and T0 are upper and lower bounds of the energy-storing duration, respectively.

$$dI_L = \frac{1}{L}\int_{T0}^{T1}(V_L)dt = \quad \text{formula (3)}$$
$$\frac{(V_L)(T1-T0)}{L} = \frac{(V_{IN} - V_{M1} - V_{OUT})(T1-T0)}{L}$$

After obtaining the current $dI_L$, the controller 320 may calculate formula (4) to obtain the current $I_{SE}$ of the inductor L in the energy-storing duration $T_{SE}$. In formula (4), $I_0$ represents the current of the inductor L at the time T0. Since the converter 310 operates in the DCM, the initial current $I_0$ of the inductor L at the time T0 is zero. The energy-storing duration $T_{SE}$ is the duty cycle of the duty cycle signal (that is, the power switch M1 is turned on during the energy-storing)

$$I_{SE} = I_0 + dI_L = \quad \text{formula (4)}$$
$$\frac{(V_{IN} - V_{M1} - V_{OUT})(T1-T0)}{L} = \frac{(V_{IN} - V_{M1} - V_{OUT})T_{SE}}{L}$$

Therefore, in another embodiment, the controller 320 may further obtains an input power Pop by calculating formula (5). In formula (5), Vop and Iop are input voltage and input current, respectively, thereby obtaining the duty cycle signal.

$$\text{Pop} = V_{op} \times I_{op} = V_{op}\left[\frac{I_{SE} \times T_{SE}}{2} \times \frac{T_{SE}}{T_P}\right] \quad \text{formula (5)}$$

$$I_{OP} = \left[\frac{I_{SE} \times T_{Duty}^2}{2 \times T_P}\right]$$

$$2 \times T_P \times I_{OP} = I_{SE} \times T_{DUTY}^2 = \frac{(V_{IN} - V_{OUT})T_{Duty}^3}{L}$$

$$T_{DUTY}^3 = \frac{2 \times L \times T_P \times I_{OP}}{V_{OP} - V_{M1} - V_{out}}$$

$$T_{DUTY} = \sqrt[3]{\frac{2 \times L \times T_P \times I_{OP}}{V_{op} - V_{out}}}$$

Figure 10:
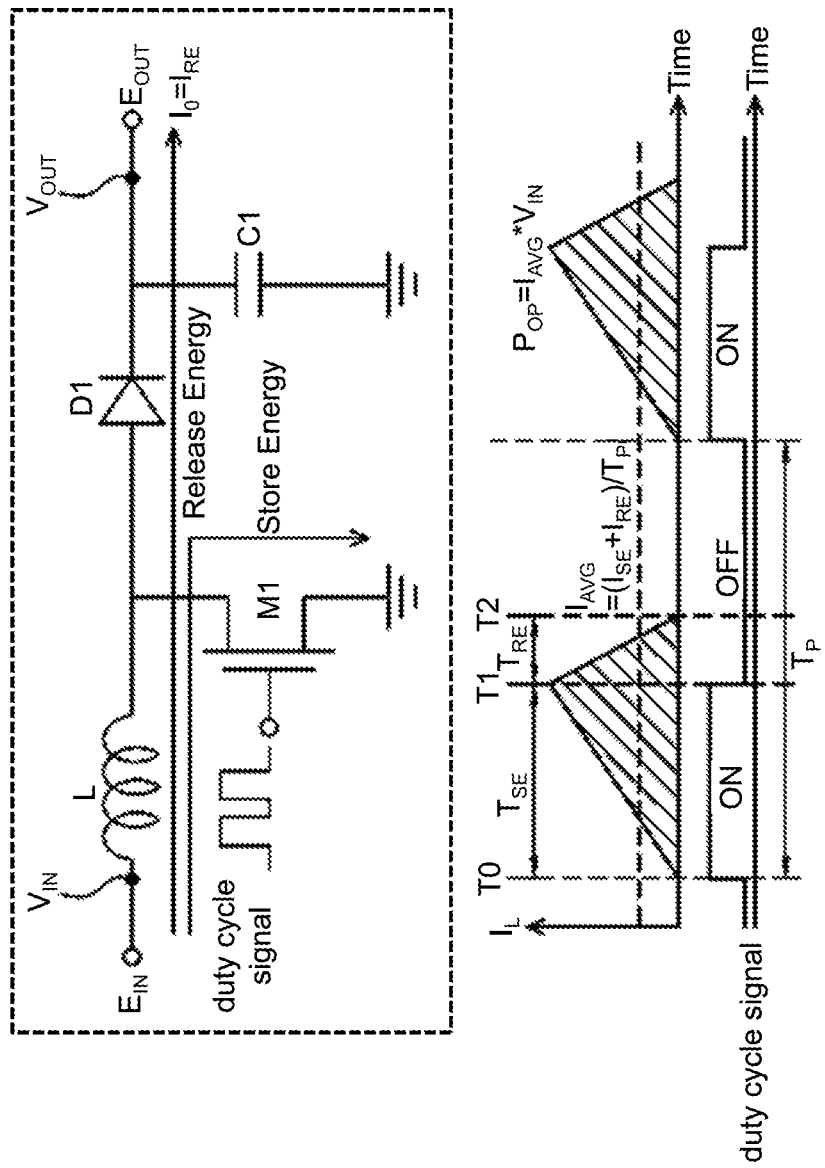
FIG. 10 is a circuit diagram of a boost converter according to another embodiment of the disclosure and illustrates waveform timing for the boost converter operating in the DCM.

In the following exemplary embodiment, the converter 310 is a boost converter. FIG. 10 is an exemplary circuit diagram of a boost converter (converter 310) according to another embodiment of the disclosure and illustrates waveform timing for the aforesaid boost converter (converter 310) operating in the DCM.

Please refer to FIGS. 3 and 10. As aforesaid, the power switch M1 is controlled by the duty cycle signal and operates according to the duty cycle signal; and the power switch M1 divides a power conversion operation into an inductance energy-storing operation and an inductance energy-releasing operation. In the energy-storing duration, the power switch M1 is turned on and the current of the input electrical energy $E_{IN}$ may be stored in the inductor L; while in the energy-releasing duration, the power switch M1 is turned off and the inductor L provides a current flowing from the diode D1 to the capacitor C1 and the load 20.

The lower part of FIG. 10 illustrates a waveform timing of the duty cycle signal, in which the abscissa represents time and the ordinate represents the amplitude of the duty cycle signal. The middle part of FIG. 10 shows the current waveform of the inductor L operating in the DCM, in which the abscissa represents time and the ordinate represents the current $I_L$ of the inductor L. When the inductor L operates in the energy-storing duration, the controller 420 calculates the voltage difference $V_L$ of the inductor L by formula (6), in which $V_{IN}$ represents the voltage of the input electrical energy $E_{IN}$ and $V_{M1}$ represents the conductive voltage drop of power switch M1.

$$V_L = V_{IN} - V_{M1} \quad \text{formula (6)}$$

After obtaining the voltage difference $V_L$ of the inductor L in the energy-storing duration $T_{SE}$, the controller 320 may calculate formula (1) to obtain the current $I_L$ of the inductor L, as illustrated in the derision of formula (7). In formula (7), L is the inductance of the inductor L and T1 and T0 respectively represent the upper bound and the lower bound of the energy-storing duration.

$$dI_L = \frac{1}{L}\int_{T0}^{T1}(V_L)dt = \frac{(V_L)(T1-T0)}{L} = \frac{(V_{IN}-V_{M1})(T1-T0)}{L} \quad \text{formula (7)}$$

After obtaining the current $dI_L$, the controller 320 calculates formula (8) to obtain the current $I_{SE}$ of the inductor L in the energy-storing duration $T_{SE}$. In formula (8), $I_0$ represents the current of the inductor L at the time T0. Since the converter 310 operates in the DCM, the initial current $I_0$ of the inductor L at the time T0 is zero. The energy-storing duration $T_{SE}$ is the duty cycle of the duty cycle signal (that is, the power switch M1 is turned on during the energy storing)

$$I_{SE} = I_0 + dI_L = \frac{(V_{IN}-V_{M1})(T1-T0)}{L} = \frac{(V_{IN}-V_{M1})T_{SE}}{L} \quad \text{formula (8)}$$

When the inductor L operates in the energy-releasing duration $T_{RE}$, the controller 320 may calculate formula (9) so as to calculate the voltage difference $V_L$ of the inductor L in the energy-releasing duration $T_{RE}$. In formula (9), $V_{OUT}$ represents the voltage of the output electrical energy $E_{OUT}$, $V_{D1}$ represents a forward voltage drop of the diode D1 and $V_{IN}$ represents the voltage of the input electrical energy $E_{IN}$. In some embodiments, the forward voltage drop $V_{D1}$ of the diode D1 may be a constant value, or an approximate value of the forward voltage drop $V_{D1}$ of the diode D1 may be obtained by the following simple formula:

$$V_L = V_{OUT} + V_{D1} - V_{IN} \quad \text{formula (9)}$$

After obtaining the voltage difference $V_L$ of the inductor L in the energy-releasing duration $T_{RE}$, the controller 320 may calculate formula (1) to obtain a current $dI_L'$ of the inductor L in the energy-releasing duration $T_{RE}$, as illustrated in the derision of formula (10). In formula (10), T1 and T2 respectively represent a lower bound and an upper bound of the energy-releasing duration $T_{RE}$.

$$dI_L' = \frac{1}{L}\int_{T1}^{T2}(V_L)dt = \frac{(V_L)(T2-T1)}{L} =$$
$$\frac{(V_{OUT}-V_{D1}-V_{IN})(T2-T1)}{L} = \frac{(V_{IN})(T1)}{L} \quad \text{formula (10)}$$
$$T_{RE} = T2 - T1 = \frac{V_{IN} \times T1}{(V_{OUT}+V_{D1}-V_{IN})}$$

In another embodiment, the controller 320 may obtain the input power Pop by calculating formula (5), and then further obtains the duty cycle signal.

In summary, the PPT apparatus and the PPT method in the embodiments of the disclosure may track the output power points and the power of the energy source 10 by the duty cycle signal.

It will be apparent to those skilled in the art that various modifications and variations can be made to the structure of the disclosed embodiments. It is intended that the specification and examples be considered as exemplars only, with a true scape of the disclosure being indicated by the following claims and their equivalents.

What is claimed is:

1. A power point tracking method, comprising:
   obtaining, by a controller, a first operating point and a first characteristic curve according to an open-circuit voltage or an input voltage of an energy harvester;
   calculating, by the controller, a first duty cycle signal according to the first operating point, a converter characteristic, an output voltage and a desired operating point;
   operating, by a converter, after receiving the first duty cycle signal;
   obtaining, by the controller, a second characteristic curve by calculating a second operating point according to the input voltage, the output voltage and the first duty cycle signal; and
   calculating, by the controller, a second duty cycle signal for transferring to the converter for a tracking control according to the second characteristic curve, the converter characteristic, the output voltage and the desired operating point.

2. The power point tracking method as claimed in claim 1, wherein if the energy harvester fails to be modelled, the first operating point is recorded and the controller adjusts the duty cycle signal according to the first operating point.

3. The power point tracking method as claimed in claim 2, wherein after having adjusted the duty cycle signal, an input power is calculated according to the input voltage and an input current to find the first operating point.

4. The power point tracking method as claimed in claim 1, wherein the converter comprises a direct current to direct current (DC-DC) converter.

5. The power point tracking method as claimed in claim 4, wherein the converter characteristic comprises a synchronous DC-DC converter or an asynchronous DC-DC converter or other power converters.

6. The power point tracking method as claimed in claim 1, wherein the converter comprises a boost converter, a buck converter, a buck-boost converter, a flyback converter, a single-ended primary-inductor converter or a step-down/step-up converter based on a switching boost-buck topology.

7. The power point tracking method as claimed in claim 1, wherein the controller further comprises an analog-to-digital converter, a processor, a duty cycle generator and a mode generator.

8. The power point tracking method as claimed in claim 7, wherein the controller is a digital controller.

9. The power point tracking method as claimed in claim 8, wherein the controller comprises one or more analog to digital converters.

10. The power point tracking method as claimed in claim 7, wherein the processor is an application-specific integrated circuit or a microcontroller unit.

11. The power point tracking method as claimed in claim 7, wherein the mode generator provides the first and the second characteristic curves to the processor.

12. The power point tracking method as claimed in claim 11, wherein the mode generator is chosen from a group consisting of an energy harvester, a limited energy, a rectified alternating current (AC) typed energy harvester, and a rectified AC typed limited energy.

13. The power point tracking method as claimed in claim 1, wherein the controller and the converter operate in at least one of a discontinuous current mode (DCM) and a continuous current mode (CCM).

14. A power point tracking apparatus, comprising:
a converter, coupled to a controller, wherein the converter utilizes an inductor inside the converter to perform a power conversion operation according to a duty cycle signal of the controller so as to convert an input voltage supplied by an energy harvester into an output voltage for a load; and
the controller, wherein the controller calculates the duty cycle signal for transferring to the converter for a tracking control according to a characteristic curve, a converter characteristic and the output voltage.

15. The power point tracking apparatus as claimed in claim 14, wherein the energy harvester is a fuel cell, a thermoelectric harvester, a photovoltaic harvester, a piezoelectric harvester or a direct current device with limited energy.

16. The power point tracking apparatus as claimed in claim 14, wherein the controller senses an input voltage according to the duty cycle signal to obtain the characteristic curve and calculate another duty cycle signal.

17. The power point tracking apparatus as claimed in claim 14, wherein the controller is a digital controller.

18. The power point tracking apparatus as claimed in claim 17, wherein the controller comprises one or more analog to digital converters.

19. The power point tracking apparatus as claimed in claim 14, wherein the converter comprises a direct current to direct current (DC-DC) converter.

20. The power point tracking apparatus as claimed in claim 19, wherein the converter characteristic comprises a conductive voltage drop of a power switch inside the DC-DC converter or a forward voltage drop of a diode inside the DC-DC converter.

21. The power point tracking apparatus as claimed in claim 20, wherein the converter comprises a boost converter, a buck converter, a buck-boost converter, a flyback converter, a single-ended primary-inductor converter or a step-down/step-up converter based on a switching boost-buck topology.

22. The power point tracking apparatus as claimed in claim 14, wherein the controller further comprises at least one analog-to-digital converter, a processor, a duty cycle generator and a mode generator.

23. The power point tracking apparatus as claimed in claim 22, wherein the duty cycle generator is a digital pulse width modulation generator for generating the duty cycle signal.

24. The power point tracking apparatus as claimed in claim 22, wherein the duty cycle generator is a digital pulse width modulation generator for generating the duty cycle signal, or the duty cycle generator uses a digital-to-analog converter and a sawtooth generator to generate the duty cycle signal through a comparator.

25. The power point tracking apparatus as claimed in claim 22, wherein the processor is an application-specific integrated circuit or a microcontroller unit.

* * * * *